(12) United States Patent
Du et al.

(10) Patent No.: US 11,768,843 B1
(45) Date of Patent: Sep. 26, 2023

(54) RESULTS RANKING WITH SIMULTANEOUS SEARCHEE AND SEARCHER OPTIMIZATION

(71) Applicant: Microsoft Technology Licensing, LLC, Redmond, WA (US)

(72) Inventors: Peng Du, Fremont, CA (US); Mathew H. Teoh, Mountain View, CA (US); Rupesh Gupta, Newark, CA (US); Anand Kishore, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/752,753

(22) Filed: May 24, 2022

(51) Int. Cl.
G06F 16/2457 (2019.01)
G06F 16/248 (2019.01)

(52) U.S. Cl.
CPC ...... *G06F 16/24578* (2019.01); *G06F 16/248* (2019.01); *G06F 16/24573* (2019.01)

(58) Field of Classification Search
CPC ......... G06F 16/24578; G06F 16/24573; G06F 16/248
See application file for complete search history.

(56) References Cited

U.S. PATENT DOCUMENTS

| | | | | |
|---|---|---|---|---|
| 7,437,335 B2 * | 10/2008 | Baum | .................... | G06N 20/00 706/14 |
| 9,002,858 B1 * | 4/2015 | Dassa | .................. | G06F 16/958 707/750 |
| 11,481,647 B1 * | 10/2022 | Bataineh | ................ | G06N 20/00 |
| 2013/0268468 A1 * | 10/2013 | Vijayaraghavan | ..... | G06N 20/00 706/12 |
| 2015/0066918 A1 * | 3/2015 | Wang | ...................... | G06F 16/93 707/723 |
| 2015/0242755 A1 * | 8/2015 | Gross | ................. | G06Q 30/0241 706/46 |
| 2015/0347414 A1 * | 12/2015 | Xiao | ....................... | G06N 7/00 707/749 |
| 2018/0232375 A1 * | 8/2018 | Venkataraman | ......... | G06N 5/01 |
| 2019/0205761 A1 * | 7/2019 | Wu | ....................... | G06F 16/353 |
| 2020/0012650 A1 * | 1/2020 | Fan | ................... | G06F 16/24578 |
| 2020/0401643 A1 * | 12/2020 | Liu | ........................ | G06N 3/084 |
| 2020/0410025 A1 * | 12/2020 | Arunmozhi | ......... | G06F 16/9536 |
| 2021/0004379 A1 * | 1/2021 | Lee | .................... | G06Q 30/0282 |

(Continued)

*Primary Examiner* — Jorge A Casanova
(74) *Attorney, Agent, or Firm* — NICHOLSON DE VOS WEBSTER & ELLIOTT LLP

(57) ABSTRACT

Embodiments include technologies to apply at least one machine learning model to features of a search query, features of a searcher user, features of a searchee content item, and features of a searchee user, produce a first outcome prediction that represents a probability of a first objective relating to engagement of the searcher user with a content item in an online system and a second outcome prediction that represents a probability of a second objective relating to engagement of the searchee user with the online system responsive to the engagement of the searcher user with the content item, apply a multi-objective optimization solver to the first objective, the second objective and an outcome prediction that is a combination of the first outcome prediction and the second outcome prediction, and generate a serving function for a search engine based on the first objective, the second objective, and the outcome prediction.

20 Claims, 6 Drawing Sheets

(56) References Cited

U.S. PATENT DOCUMENTS

| | | | |
|---|---|---|---|
| 2021/0256367 A1* | 8/2021 | Mor | G06Q 30/0282 |
| 2023/0106319 A1* | 4/2023 | Stegman | G06F 16/24578 |
| | | | 707/723 |

* cited by examiner

FIG. 5

502 Based on a search query received from a searcher user, generate a set of search results that includes a content item created by a searchee user of the online system and distributed in the online system by the searchee user.

504 Apply at least one machine learning model to features of the search query, features of the searcher user, features of the searchee user, and features of the searchee content item.

506 Produce, by the at least one machine learning model, (i) a first outcome prediction that represents a probability of a first objective relating to engagement of the searcher user with the content item and (ii) a second outcome prediction that represents a probability of a second objective relating to engagement of the searchee user with the online system subsequent to the engagement of the searcher user with the content item.

508 Apply a multi-objective optimization algorithm to the first objective and the second objective given the first outcome prediction and the second outcome prediction.

510 Generate a serving function based on the first objective and the second objective.

512 Produce a set of ranked search results based on the set of search results.

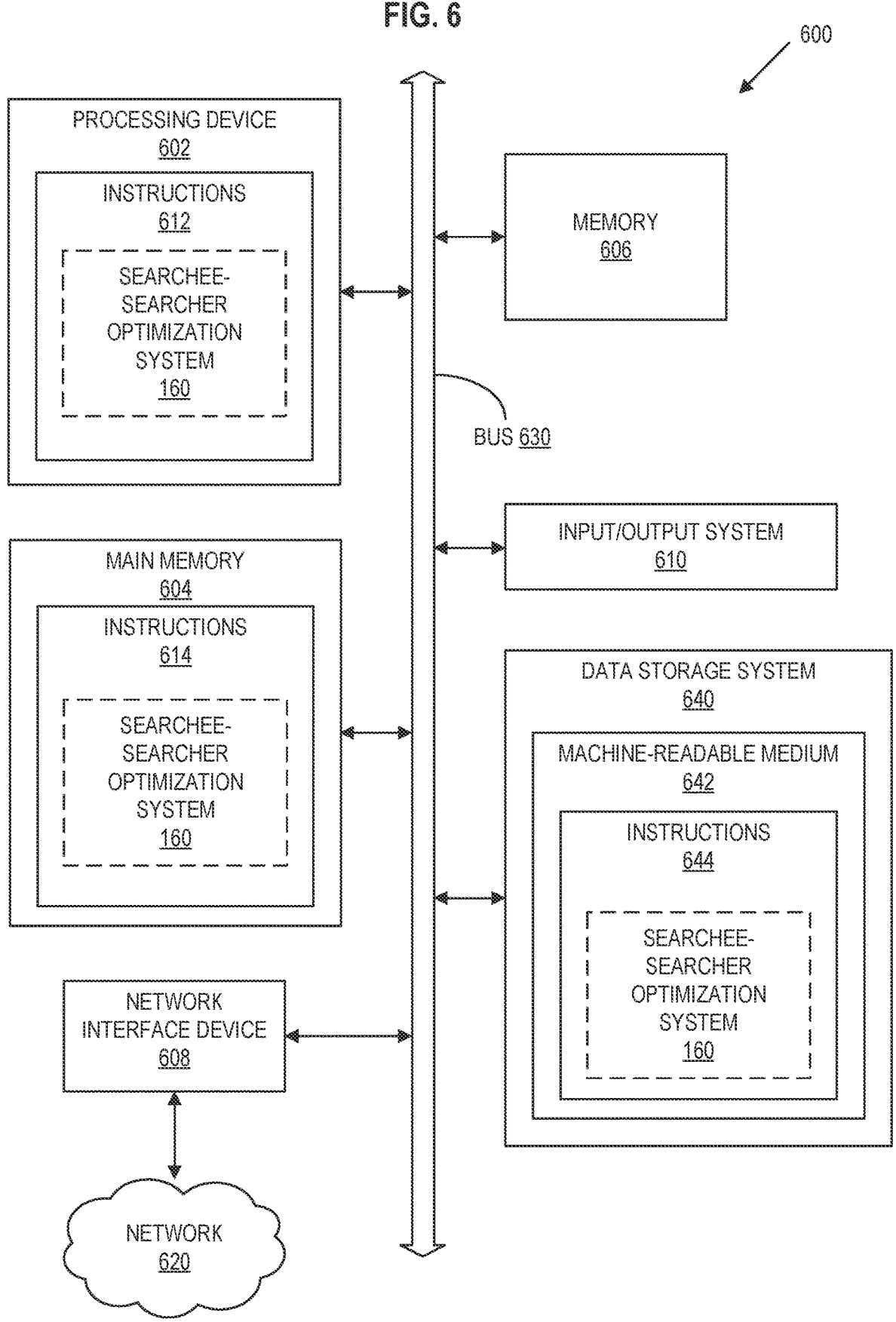

US 11,768,843 B1

RESULTS RANKING WITH SIMULTANEOUS SEARCHEE AND SEARCHER OPTIMIZATION

TECHNICAL FIELD

A technical field to which the present disclosure relates is search engines. Another technical field to which the present disclosure relates is machine learning-based search results ranking.

BACKGROUND

Software applications use search engines to facilitate the delivery of digital content to users of an online system in accordance with the users' search queries. Machine learning models have been used to determine the user intent associated with the search query and match the user intent with digital content items. For example, ranking models can score digital content items based on relevance to a user's search query and/or other factors that are specific to the user who entered the search query, such as historical interaction data of the searching user. Scores produced by ranking models can be used to sort lists of search results so that higher scoring items appear more prominently than lower scoring items when the list of search results is presented to the searching user.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 5 is a flow diagram of an example method to generate ranked search results in accordance with some embodiments of the present disclosure.

FIG. 6 is a block diagram of an example computer system in which embodiments of the present disclosure can operate.

DETAILED DESCRIPTION

Figure 1:
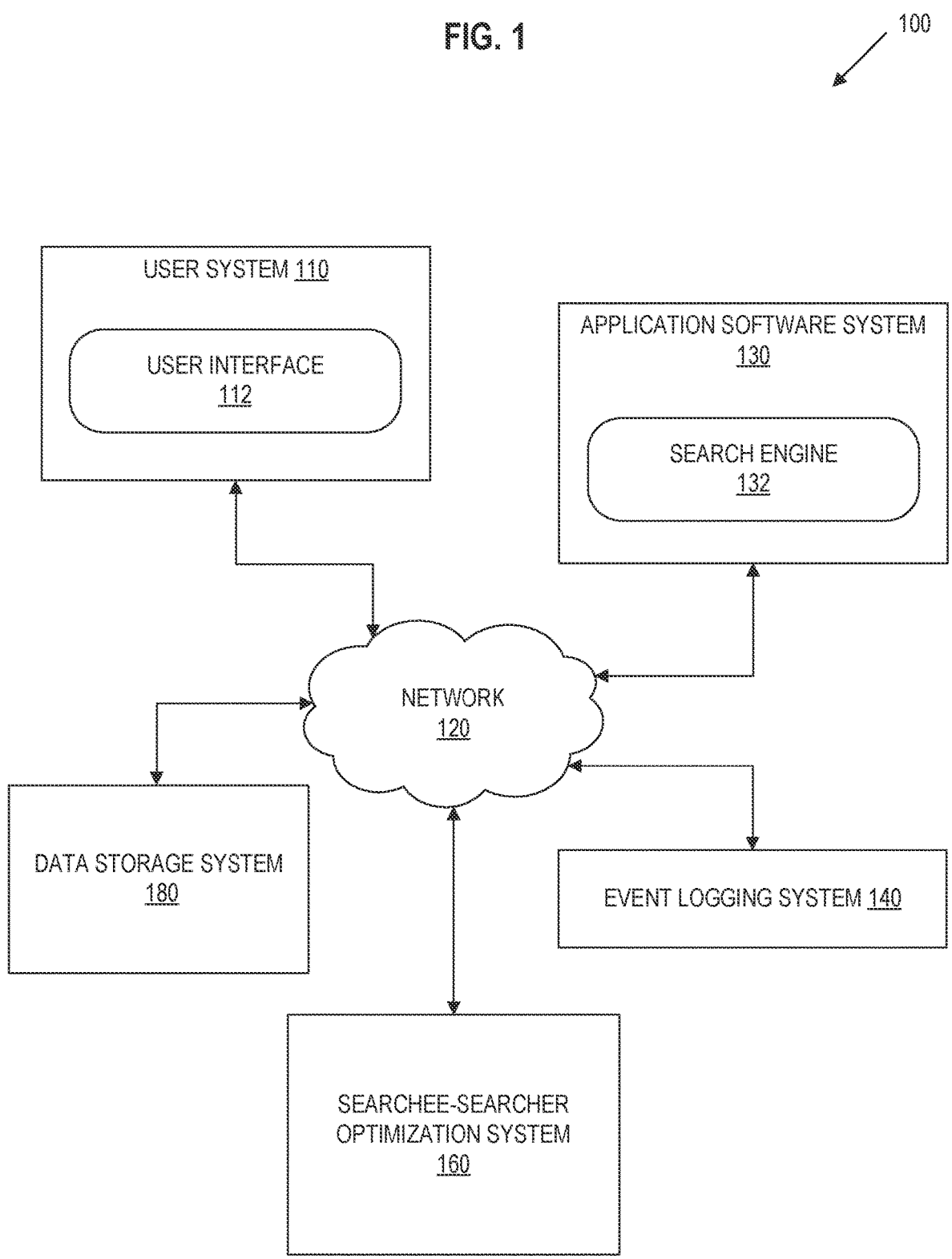
FIG. 1 illustrates an example computing system that includes a searchee-searcher optimization system in accordance with some embodiments of the present disclosure.

Aspects of the present disclosure are directed to technologies for ranking search results returned in response to a search query.

In one example use case, a user of an online system distributes a digital content item to other users of the online system. For instance, the user posts or distributes an article, comment, status update, advertisement, marketing material, graphic or video, or shares a content item originally distributed by another user. Other users, including but not limited to connections or followers of the user, may from time to time issue search queries in the online system. When a content-distributing user's content item appears in another user's search results, the content-distributing user is referred to herein as the searchee user. The user issuing the query that returned the searchee user's content item as a search result is referred to herein as the searcher user. Stated another way, a content consuming user, or content consumer, is a searcher user, and an author of content, or content author, is a searchee user.

An online system often logs events that represent user interactions with the online system. For example, each time any user logs in to the online system, issues a search query, or views, selects, likes, comments on, or shares a search result, the online system logs a corresponding event. Machine learning models used by search engines are often trained at least partly on such logged event data. For example, training data for such machine learning models may include a searching user's prior search history and/or the log data for searching user's interactions with previously-presented displays of search results.

In other systems, search engines have been designed to optimize the search experience for searcher users so that the searched-for information can be quickly found. For example, machine learning models are trained to determine relevance by measuring correlations between characteristics of content items and historical interaction data of searcher users. These searcher-centric approaches of other systems have not incorporated information about downstream interactions of searchee users into the search result ranking process.

However, biases inherent in searcher-centric approaches have produced sub-optimal search result rankings. For example, suppose a searcher user issues the query "mental health," and the search engine finds two articles in the searcher user's social network: one article authored by a famous person such as Bill Gates, who the searcher user follows, and another article authored by one of the searcher user's teammates at work. Even though the searcher user is connected to the teammate in the social network and follows Bill Gates, those other search engines would likely rank the Bill Gates article rather than the teammate's article at the highest position because Bill Gates' article is very popular (e.g., has gone 'viral'). This is because the prior ranking mechanisms optimize only for the searcher/consumer experience and not for the author/creator experience. Ranking the teammate's article lower than the Bill Gates article could be sub-optimal because the teammate's article likely might be at least as interesting or valuable to the searcher user and the searcher user could potentially engage directly with the teammate about the article.

Additionally, assuming the teammate is not as well-known or at least not as prolific a publisher as Bill Gates, the teammate would likely benefit more from the searcher user's click than would Bill Gates. That is, the Bill Gates article may likely already have thousands of views, such that the searcher user's view of the article has only marginal impact. On the other hand, the teammate may have a much smaller initial audience for their article such that the searcher user's view, like or share of the article could expand the potential audience significantly and thus have a much greater impact.

It is a technical challenge to incorporate searchee user information into the search result ranking process because the searcher and searchee user objectives often conflict. That is, optimizing for the searchee user's objectives alone produces sub-optimal results for the searcher user, and optimizing for the searcher user's objectives alone produces sub-optimal results for the searchee user.

Aspects of the present disclosure address the above and other deficiencies and challenges. As described in more detail below, embodiments provide a searchee-searcher optimization system that can be incorporated into a search engine's result ranking pipeline to produce a serving plan that is optimized for multiple conflicting objectives related to both searcher users and searchee users. Embodiments utilize a combination of multi-task learning and multi-objective optimization to efficiently generate outcome predictions for both searchee and searcher objectives for a given set of search results, combine the searchee and searcher outcome predictions into a ranking score for each search result in the set, and use the ranking scores to sort the set of search results in rank order.

The disclosed technologies are described with reference to a use case of ranking online search results in response to a searcher user's query, where the search results contain at least one result by a searchee user. In parts of this disclosure, references are made to the specific use case in which the searchee user has a logical relationship with the searcher user in the online system; for example as a connection, a friend, or a follower in a social graph. However, the disclosed technologies are not limited to applications in which searchee and searcher users are logically related, whether by a social graph or otherwise. The disclosed technologies can be employed by many different types of network-based applications in which search engines are provided, including but not limited to various types and forms of application software systems.

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 1 illustrates an example computing system 100 that includes a searchee-searcher optimization system in accordance with some embodiments of the present disclosure.

In the embodiment of FIG. 1, computing system 100 includes a user system 110, a network 120, an application software system 130, an event logging system 140, a searchee-searcher optimization system 160, and a data storage system 180.

As shown in FIG. 6, embodiments of searchee-searcher optimization system 160 are implemented as instructions stored in a memory, and a processing device 602 can be configured to execute the instructions stored in the memory to perform the operations described herein. Further details with regard to the operations of the searchee-searcher optimization system 160 are described below.

User system 110 includes at least one computing device, such as a personal computing device, a server, a mobile computing device, or a smart appliance. User system 110 includes at least one software application, including a user interface 112, installed on or accessible by a network to a computing device. In some embodiments, user interface 112 is or includes a front-end portion of application software system 130. For example, embodiments of user interface 112 include a graphical display screen that includes a search interface. The search interface includes at least one input element, such as a text box, a microphone icon, or a display of selectable pre-formulated search criteria, and one or more slots. A slot as used herein refers to a space on a graphical display such as a web page or mobile device screen, into which digital content may be loaded, for example a list of search results. The locations and dimensions of a particular slot on a screen are specified using, for example, a markup language such as HTML (Hypertext Markup Language). On a typical display screen, a slot is defined by two-dimensional coordinates; however, in other systems, such as a virtual reality or augmented reality implementation, a slot may be defined using a three-dimensional coordinate system.

User interface 112 is any type of user interface as described above. User interface 112 can be used to input search queries and view or otherwise perceive output that includes data produced by application software system 130. For example, user interface 112 can include a graphical user interface and/or a conversational voice/speech interface that includes a mechanism for scrolling a set of search results or a news feed, creating, viewing, and interacting with social media posts, or entering a search query and viewing query results and/or other digital content. Examples of user interface 112 include mobile app user interface display screens, web browsers, command line interfaces, and non-visual (e.g., speech, audio, haptic, or gesture) user interfaces. User interface 112 as used herein can include application programming interfaces (APIs).

Application software system 130 is any type of application software system that provides or enables at least one form of digital content distribution to user systems such as user system 110. Examples of application software system 130 include but are not limited to connections network software, such as social media platforms, and systems that are or are not based on connections network software, such as general-purpose search engines, job search software, recruiter search software, sales assistance software, content distribution software, learning and education software, or any combination of any of the foregoing.

Application software system 130 includes a search engine 132. Search engine 132 receives search queries, such as natural language queries submitted via user interface 112, converts the received queries to machine-executable form, executes the converted queries against a corpus of digital content items, and retrieves sets of search results that correspond to the queries. The corpus of digital content items may be stored in data storage system 180 and/or one or more other devices. The corpus of digital content items is limited to documents that are accessible by application software system 130, in some embodiments. For example, the corpus can include all digital content items created in or uploaded to, and distributed by user systems 110 in application software system 130. In other examples, the corpus can include a filtered subset of all of the digital content items that are searchable in application software system 130. For instance, the corpus can include only documents that have been published by a searcher user's connections or followers within a specified period. The corpus can be pre-defined for example by user settings and/or filtered in real time based on elements of a given search query.

Search engine 132 uses a serving plan generated by searchee-searcher optimization system 160 to determine how to rank sets of search results retrieved in response to a searcher user's query. As described in more detail below, searchee-searcher optimization system 160 generates the serving plan in accordance with both the objectives of the searcher users and the objectives of searchee users whose content items are included in the set of search results returned in response to the searcher user's query. While shown separately for clarity in FIG. 1, searchee-searcher optimization system 160 is implemented as a network service, or as part of search engine 132, or as part of application software system 130 more generally, in various embodiments.

Event logging system 140 captures user interface events such as the input of search criteria, page loads, views, and clicks in real time. Event logging system 140 formulates the user interface events into a data stream that can be consumed by, for example, a stream processing system. For example, when a user of application software system 130 enters a search query, selects (e.g., clicks or taps on) a user interface control to execute the search query, or views or interacts with a set of search results, the event logging service fires an event to capture an identifier, an event type, a date/timestamp at which the user interface event occurred, and possibly other information about the user interface event, such as the impression portal and/or the impression channel involved in the user interface event (e.g., device type, operating system, etc.).

The event logging system 140 generates a data stream that includes one record of real-time event data for each user interface event that has occurred. Time as used in the context of terminology such as real-time refers to a time delay introduced by the use of computer technology, e.g., by automated data processing and/or network transmission, where the time delay is the difference in time, as measured by a system clock, between the occurrence of an online event and the use of data processed in response to the event, such as for display, feedback, and/or control purposes.

Data storage system 180 includes data stores and/or data services that store digital content items, data received, used, manipulated, and produced by application software system 130. Alternatively or in addition, data storage system 180 includes data stores and/or data services that store data received, used, manipulated, and produced by event logging system 140, such as user interface event data streams. In some embodiments, data storage system 180 includes multiple different types of data storage and/or a distributed data service. As used herein, data storage system may refer to a physical, geographic grouping of machines, a logical grouping of machines, or a single machine. For example, a data storage system may be a data center, a cluster, a group of clusters, or a machine.

Data stores of data storage system 180 can be configured to store data produced by real-time, near real-time (also referred to as nearline), and/or offline (e.g., batch) data processing. A data store configured for real-time data processing can be referred to as a real-time data store. A data store configured for near real-time data processing can be referred to as a near real-time data store or nearline data store. A data store configured for offline or batch data processing can be referred to as an offline data store. Data stores can be implemented using databases, such as key-value stores, relational databases, and/or graph databases. Data can be written to and read from data stores using query technologies, e.g., SQL or NoSQL.

A key-value database, or key-value store, is a nonrelational database that organizes and stores data records as key-value pairs. The key uniquely identifies the data record, i.e., the value associated with the key. The value associated with a given key can be, e.g., a single data value, a list of data values, or another key-value pair. For example, the value associated with a key can be either the data being identified by the key or a pointer to that data. A relational database defines a data structure as a table or group of tables in which data are stored in rows and columns, where each column of the table corresponds to a data field. Relational databases use keys to create relationships between data stored in different tables, and the keys can be used to join data stored in different tables. Graph databases organize data using a graph data structure that includes a number of interconnected graph primitives. Examples of graph primitives include nodes, edges, and predicates, where a node stores data, an edge creates a relationship between two nodes, and a predicate is assigned to an edge. The predicate defines or describes the type of relationship that exists between the nodes connected by the edge.

Data storage system 180 resides on at least one persistent and/or volatile storage device that can reside within the same local network as at least one other device of computing system 100 and/or in a network that is remote relative to at least one other device of computing system 100. Thus, although depicted as being included in computing system 100, portions of data storage system 180 can be part of computing system 100 or accessed by computing system 100 over a network, such as network 120.

While not specifically shown, it should be understood that any of user system 110, application software system 130, event logging system 140, searchee-searcher optimization system 160, and data storage system 180 includes an interface embodied as computer programming code stored in computer memory that when executed causes a computing device to enable bidirectional communication with any other of user system 110, application software system 130, event logging system 140, searchee-searcher optimization system 160, and data storage system 180 using a communicative coupling mechanism. Examples of communicative coupling mechanisms include network interfaces, inter-process communication (IPC) interfaces and application program interfaces (APIs).

A client portion of application software system 130 or search engine 132 can operate in user system 110, for example as a plugin or widget in a graphical user interface of a software application or as a web browser executing user interface 112. In an embodiment, a web browser can transmit an HTTP request over a network (e.g., the Internet) in response to user input that is received through a user interface provided by the web application and displayed through the web browser. A server running application software system 130, for example a server portion of application software system 130 or search engine 132, can receive the input, perform at least one operation using the input, and return output using an HTTP response that the web browser receives and processes.

Each of user system 110, application software system 130, event logging system 140, searchee-searcher optimization system 160, and data storage system 180 is implemented using at least one computing device that is communicatively coupled to electronic communications network 120. Any of user system 110, application software system 130, event logging system 140, searchee-searcher optimization system 160, and data storage system 180 can be bidirectionally communicatively coupled by network 120. User system 110 as well as one or more different user systems (not shown) can be bidirectionally communicatively coupled to application software system 130.

A typical user of user system 110 can be an administrator or end user of application software system 130 and/or searchee-searcher optimization system 160. User system 110 is configured to communicate bidirectionally with any of application software system 130, event logging system 140, and/or searchee-searcher optimization system 160 over network 120.

The features and functionality of user system 110, application software system 130, event logging system 140, searchee-searcher optimization system 160, and data storage system 180 are implemented using computer software, hardware, or software and hardware, and can include combinations of automated functionality, data structures, and digital data, which are represented schematically in the figures. User system 110, application software system 130, event logging system 140, searchee-searcher optimization system 160, and data storage system 180 are shown as separate elements in FIG. 1 for ease of discussion but the illustration is not meant to imply that separation of these elements is required. The illustrated systems, services, and data stores (or their functionality) can be divided over any number of physical systems, including a single physical computer system, and can communicate with each other in any appropriate manner.

Network 120 is a computer network implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

Figure 2:
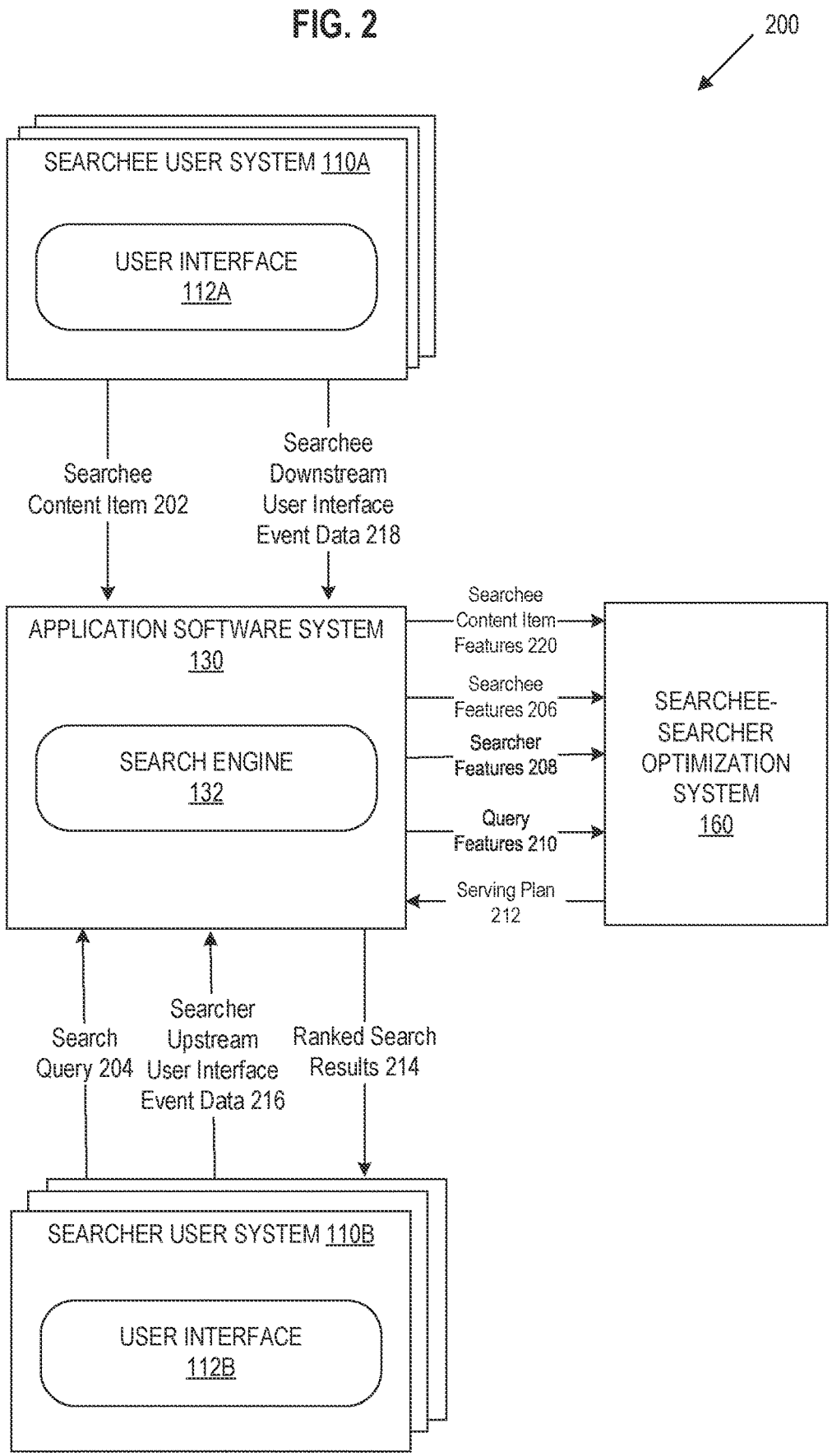
FIG. 2 is a flow diagram of an example method to generate a serving plan using a searchee-searcher optimization system in accordance with some embodiments of the present disclosure.

FIG. 2 is a flow diagram of an example method 200 to generate a serving plan using a searchee-searcher optimization system in accordance with some embodiments of the present disclosure.

The method 200 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof In some embodiments, portions of the method 200 are performed by the searchee-searcher optimization system 160 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In FIG. 2, a searchee user provides a searchee content item 202, such as a post, to application software system 130, e.g., via user interface 112A of searchee user system 110A. The use of the term "searchee" is to indicate that, after the content item 202 is received by application software system 130, the content item 202 is included in at least one set of search results returned for at least one searcher user's query.

Application software system 130 receives searchee content item 202 from searchee user system 110A and stores searchee content item 202 in a searchable data store; for example in a database of data storage system 180. Application software system 130 distributes searchee content item 202 to one or more other users of application software system 130 at various different times during the operation of application software system 130. While only one content item 202 is shown in the illustration, application software system 130 receives many different content items 202 from many different searchee user systems 110A, and any searchee user system 110A can submit any number of content items 202 to application software system 130.

For example, during a login session of a searcher user system 110B, search engine 132 of application software system 130 receives a search query 204 from searcher user system 110B, e.g., via user interface 112B. While only one search query 204 is shown in the illustration, application software system 130 receives many different search queries 204 from many different searcher user systems 110B, and any searcher user system 110B can submit any number of search queries 204 to application software system 130.

Search engine 132 formulates a search that corresponds to search query 204. To formulate the corresponding search, search engine 132 may, for instance, add metadata to the search query and/or convert natural language words or phrases into instructions that the search engine 132 can execute. Search engine 132 executes the corresponding search on a corpus, such as a searchable database that includes searchee content item 202. Search engine 132 creates a set of search results produced by the execution of the searcher user's search on the corpus.

Search engine 132 and/or other components of application software system 130 communicate bidirectionally with searchee-searcher optimization system 160 to generate a serving plan 212. Search engine 132 applies serving plan 212 to the set of search results to produce ranked search results 214. Search engine 132 and/or another component of application software system 130 sends to searcher user system 110B the set of ranked search results 214 that includes searchee content item 202.

Searchee-searcher optimization system 160 receives searchee content item features 220, searchee features 206, searcher features 208, and query features 210 from one or more components of application software system 130. For instance, searchee-searcher optimization system 160 receives searchee content item features 220 from one or more feature stores of data storage system 180 for data associated with searchee content item 202. Examples of searchee content item features 220 include raw features, such as raw text data (e.g., title, body, etc.), or computed features, such as numerical representations of raw features (e.g., vector representations of raw data, or embeddings).

As another example, searchee-searcher optimization system 160 receives searchee features 206 by querying one or more feature stores of data storage system 180 for data records created by event logging system 140 that match an identifier associated with the searchee user. Searchee-searcher optimization system 160 receives searcher features 208 by querying one or more feature stores of data storage system 180 for data records created by event logging system 140 that match an identifier associated with the searcher user. Searchee-searcher optimization system 160 receives query features 210 by querying one or more feature stores of data storage system 180 for data associated with search query 204.

In some embodiments, searchee features 206 are generated based on searchee downstream user interface event data 218. Searchee features 206 include raw features, such as raw profile data (e.g., company name, job title, location, etc.), raw interaction data, or computed features, such as numerical representations of raw features (e.g., aggregations of raw data, vector representations of raw data, or embeddings). Searchee downstream user interface event data 218 include, for example, user interaction data recorded by event logging system 140 after previous inclusions of a searchee content item in a set of search results presented to a searcher user by application software system 130.

Examples of searchee downstream user interface event data 218 include, for example, the number of times the searchee user logged in to application software system 130 after a searcher user viewed one of the searchee's content item 202 in a set of search results presented to the searcher user by application software system 130. In more general terms, searchee features 206 capture the downstream behavior of the searchee user after a searcher user has interacted with one or more of the searchee's content items 202. For instance, searchee features 206 may be used to determine whether the searcher user's interaction with the searchee content item 202 was followed by a subsequent increase in online activity in application software system 130 by the searchee user.

In some embodiments, searcher features 208 are generated based on searcher upstream user interface event data 216. Searcher features 208 include raw features, such as raw profile data (e.g., company name, current job title, etc.), raw interaction data, or computed features, such as numerical representations of raw features (e.g., aggregations of raw data, vector representations of raw data, or embeddings). Searcher upstream user interface event data 216 include user interaction data recorded by event logging system 140 after previous interactions of the searcher user with search engine 132 and/or application software system 130.

Examples of searcher upstream user interface event data 216 include, for example, historical interaction data collected prior to and leading up to the searcher user's input of search query 204. In more general terms, searcher features 208 capture the upstream behavior of the searcher user prior to the searcher user entering search query 204. For instance, searcher features 206 can include previous search attempts and/or interactions with previously-generated search results.

To produce serving plan 212, searchee-searcher optimization system 160 applies a combination of multi-task learning and multi-objective optimization techniques to search query 204, searchee content item features 220, searchee features 206, and searcher features 208. Examples of combinations of multi-task learning and multi-objective optimization techniques that may be used by searchee-searcher optimization system 150 to generate serving plan 212 are described in more detail below with reference to FIG. 3 and FIG. 4.

Figure 3:
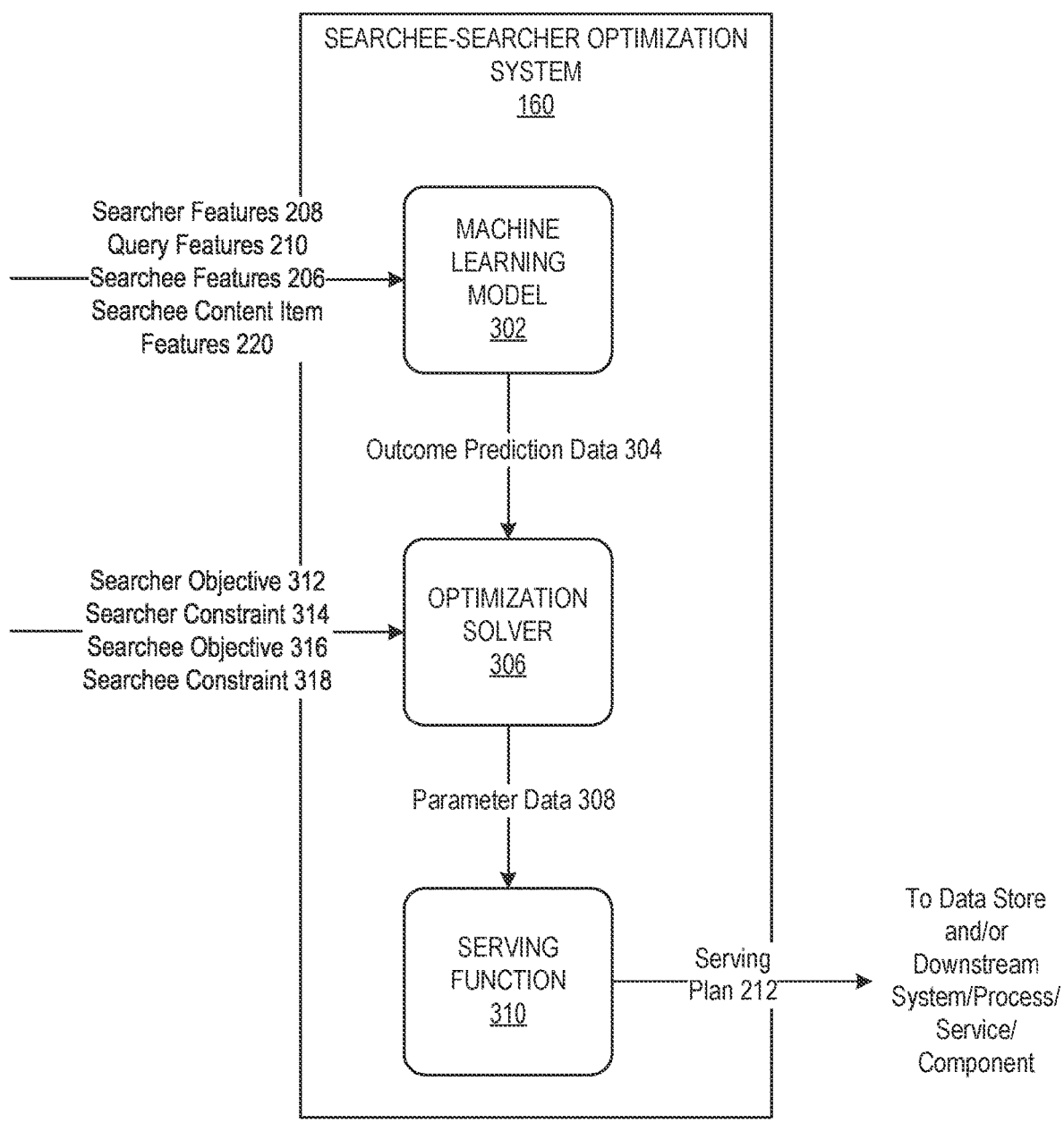
FIG. 3 is a flow diagram of an example method to implement a searchee-searcher optimization system in accordance with some embodiments of the present disclosure.

FIG. 3 is a flow diagram of an example method 300 to implement a searchee-searcher optimization system in accordance with some embodiments of the present disclosure.

The method 300 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by searchee-searcher optimization system 160 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

FIG. 3 shows an embodiment of searchee-searcher optimization system 160 that includes sub-components, including a machine learning model 302, an optimization solver 306, and a serving function 310.

In one example implementation, searchee-searcher optimization system 160 applies a machine learning model 302 to searcher features 208, query features 210, searchee content item features 220, and searchee features 206. Based on the application of machine learning model 302 to searcher features 208, query features 210, and searchee features 206, machine learning model 302 produces outcome prediction data 304. Outcome prediction data 304 includes, for example, a searcher outcome predicted probability of one or more of the features 206, 208, 210 correlating with a favorable outcome for a searcher objective 312 and a searchee outcome predicted probability of one or more of the features 206, 208, 210 correlating with a favorable outcome for a searchee objective 316. Alternatively or in addition, outcome prediction data 304 includes a single score that represents a combination of the searcher outcome predicted probability and the searchee outcome predicted probability.

In some embodiments, machine learning model 302 is implemented as a multi-task learning model that can generate both the searcher outcome predicted probability and the searchee outcome predicted probability simultaneously with the same model. Multi-task learning is a technology that enables a machine learning model to be trained to predict the probabilities of multiple outcomes. For example, the probability with which a searcher user will click a search result if that search result is shown to the searcher user and the probability with which the searchee user will start an incremental session if that search result is shown to the searcher user.

Figure 4:
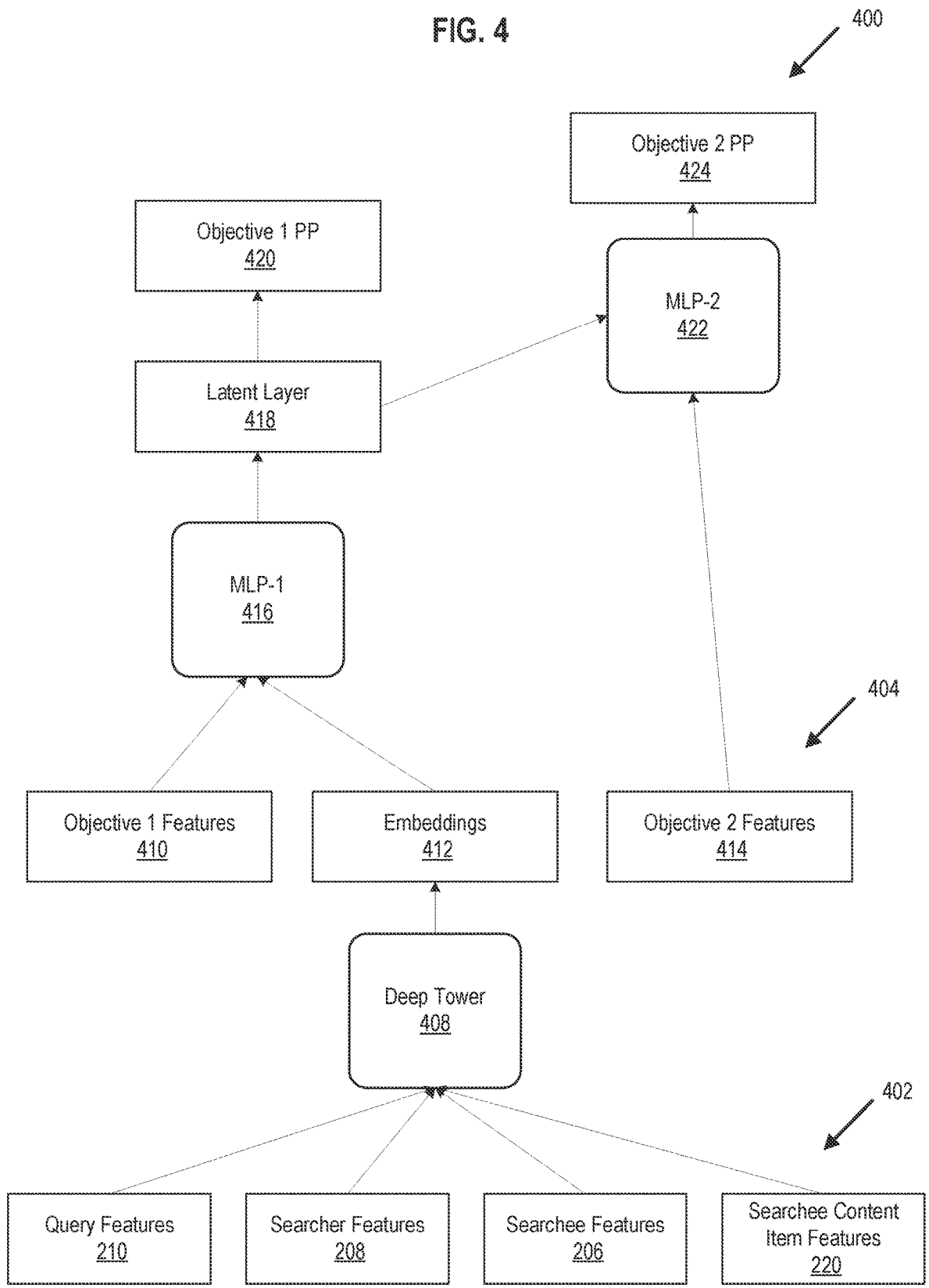
FIG. 4 is an example method to implement a machine learning model to generate outcome predictions for multiple objectives in accordance with some embodiments of the present disclosure.

The particular configuration of the multi-task learning approach described herein has been shown to have improved accuracy over other approaches that use separate models to generate each of the searcher outcome predicted probability and the searchee outcome predicted probability. An example of an architecture for a multi-task learning model that may be used to implement machine learning model 302 is shown in FIG. 4, described below.

Searcher objective 312, searcher constraint 314, searchee objective 316, and searchee constraint 318, as well as outcome prediction data 304, are inputs to optimization solver 306. Outcome prediction data 304 is generated by machine learning model 302. The values of searcher objective 312, searcher constraint 314, searchee objective 316, and searchee constraint 318 are configurable based on the requirements and/or design of a particular implementation of searchee-searcher optimization system 160.

In some embodiments, optimization solver 306 is a multi-objective linear programming (LP) solver that simultaneously optimizes for searcher objective 312 and searchee objective 316 given both searcher constraint 314 and searchee constraint 318. Multi-objective optimization is a technology that enables the predicted probabilities of various and potentially conflicting outcomes to be combined into a single score for each search result in a set of search results. The single score that is a combination of the predicted probabilities of various outcomes can be used to rank the set of search results. An example representation of a multi-objective optimization is score(search result)=function(P1, P2), where P1 is the probability with which the searcher user will click on the search result if the search result is shown to the user and P2 is the probability with which the searchee user will start an incremental session in the online system if the search result is shown to the searcher user.

An example of a searcher objective 312 is the number of satisfied clicks on search results by the searcher users, where a satisfied click may be represented as, for example, a view, like, or share of a clicked-on search result. An example of a searchee objective 316 is the number of downstream sessions by the searchee users.

The values of searcher constraint 314 and searchee constraint 318 control how optimization solver 306 balances the competing or conflicting objectives, e.g., searcher objective 312 versus searchee objective 316, i.e., how much can the optimization for the searcher objective 312 be reduced in order to increase the optimization for the searchee objective 316. For example, if the value of searcher constraint 314 is higher than the value of the searchee constraint 318, optimization solver 306 may reduce the optimal value for searcher objective 312 and increase the optimal value for searchee objective 316. If the value of searchee constraint 318 is higher than the value of the searcher constraint 314, optimization solver 306 may reduce the optimal value for searchee objective 316 and increase the optimal value for searcher objective 312.

Searcher constraint 314 and searchee constraint 318 are configured according to the requirements of a particular design or implementation of searchee-searcher optimization system 160. Searcher constraint 314 and searchee constraint 318 each are manually set and manually adjusted values in some embodiments. In other embodiments, a rule-based subsystem determines the values of searcher constraint 314 and searchee constraint 318 based on, for example, design or implementation parameters.

Configuring an optimization solver to optimize for multiple objectives at the same time is non-trivial. This is because optimizing one objective does not necessarily also optimize another objective. For example, maximizing only the searchee user side objectives could have a negative impact on the searcher user side objectives.

In some embodiments, optimization solver 306 is implemented as a constrained optimization solver that takes input in the following form:

max objective1
such that objective2>constraint1
objective3>constraint2
. . .

In these embodiments, optimization solver 306 solves the above constrained optimization problem and outputs a serving function that can be used to compute the score of each search result in a set of search results that needs to be ranked. For example: serving function(predicted probability of outcome1, predicted probability of outcome2, . . . ).

Optimization solver 306 produces parameter data 308. Parameter data 308 includes, for example, coefficient values (such as weights and/or biases) that are used to generate serving plan 212. Optimization solver 306 incorporates parameter data 308 into a generic serving function 310 to produce a version of the generic serving function 310 that is optimized for both searcher objective 312 and searchee objective 316. The optimized version of the generic serving function 310 is referred to as serving plan 212.

An example of a generic serving function is a linear combination of the searcher outcome predicted probability and the searchee outcome predicted probability. For example:

Serving function=A*PP1+B*PP2, where the values A and B are generated by optimization solver 306 for a particular searcher user and the particular searcher user's query, and PP1 and PP2 are generated by machine learning model 302 as discussed above.

A distinction between objectives and outcomes, as those terms are used herein, is that objectives are determined at an aggregate level and outcomes are determined at the individual search query level. For example, an objective 1 could the total number of clicks on search results across all queries issued by searching users, while an outcome 1 could be the likelihood that a particular searching user is to click on a search result returned for a particular search query issued by that particular searching user. Similarly, an objective 2 could be the aggregate number of downstream sessions from all content-producing (searchee) users while an outcome 2 could be whether a particular content-producing user is likely to start a new session if a search result from that particular content-producing user is clicked on by a searcher user.

Serving plan 212 is stored in a data store, such as a searchable data store of data storage system 180 and/or provided to one or more downstream systems, processes, services and/or components of search engine 132 or application software system 130. For example, serving plan 212 is provided to search engine 132, and search engine 132 applies serving plan 212 to a set of search results to generate a ranked set of search results for a particular searcher user and the particular user's search query.

FIG. 4 is an example of an example method to implement a machine learning model to generate outcome predictions for multiple objectives in accordance with some embodiments of the present disclosure.

The method 400 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the searchee-searcher optimization system 160 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In some embodiments, machine learning model 302 is an implementation of the method 400. In FIG. 4, the method 400 is implemented as a multi-task deep learning model. Portions of the multi-task deep learning model and/or its inputs and outputs are stored, for example, in data storage system 180.

Embodiments of the machine learning model 302 have training, validation, and operational phases. The method 400 is similar for each of these phases but performed using different input data sets. For example, during a training phase, the method 400 inputs training examples that include combinations of searchee content item features, searchee features, searcher features, query features, and associated ground-truth outcome prediction data. During validation and operational phases, the method 400 inputs combinations of searchee content item features, searchee features, searcher features, query features without any prediction data since during those phases, the model is used to generate the outcome prediction data.

At an input layer 402, searchee content item features 220, searchee features 206, searcher features 208, and query features 210 are input into a deep learning model, deep tower 408. Deep tower 408 is a deep neural network that includes input layer 402, multiple hidden layers (not shown), and an output layer 404. A layer of a neural network includes multiple neurons, where each neuron receives one or more inputs, applies a function to the one or more inputs to produce an output that becomes an input to a subsequent layer of the neural network or becomes the final output. An example of a function is an activation function, such as a rectified linear unit function.

Output layer 404 of deep tower 408 produces embeddings 412. Embeddings 412 are numerical representations, such as n-dimensional vectors, of combinations of searchee content item features 220, searchee features 206, searcher features 208, and query features 210. In some embodiments, transformations of the embeddings are utilized, e.g., the cosine similarities between embeddings of searchee feature 206 and searcher features 208 and the cosine similarities between embeddings of searchee feature 206 and query features 210. Objective 1 features 410 are features associated with the searcher user optimization objective while objective 2 features 414 are features associated with the searchee user optimization objective.

Examples of objective 1 features 410 include features that relate to the content consumer or searcher user. For example, measures of the utility of the online system for the searcher user, which could include signals that the searcher user found a search result helpful, such as number of views, clicks, likes, or shares on search results returned in response to the searcher user's query. Thus, objective 1 features can include positive signals and/or negative signals of the searcher user's upstream use of the online system that occur prior to the searcher user's current search query, such as the number of times the searcher user interacted with previously presented search results or the number of search queries the searcher user has entered in a given time interval.

Examples of objective 2 features 414 include objectives that relate to the content producer or searchee user. For example, measures of the utility of the online system for the searchee user, which could include signals that the searchee user is likely to use the online system again after the searcher user views the searchee user's post. Thus, objective 2 features can include positive signals and/or negative signals of the searchee user's downstream use of the online system that occur after a view of the searchee user's post, such as the number of subsequent logins, the number of subsequent sessions, or subsequent increases or decreases in posting activity by the searchee user.

The illustrated embodiments are described with reference to two competing or conflicting objectives, but this disclosure is not limited to applications in which there are only two objectives. Other embodiments incorporate more than two objectives; for example, one or more searchee user objectives and one or more searcher user objectives.

Objective 1 features 410 and objective 2 features 414 are not generated by deep tower 408 but are obtained from one or more different sources, such as feature stores of data storage system 180. For example, objective 1 features 410 and objective 2 features 414 could be hand-crafted features, in some embodiments.

Output layer 404 becomes the input layer to another multi-layer perceptron (MLP)-1 416 and MLP-2 422. MLP-1 416 is applied to objective 1 features 410 and embeddings 412 but not to objective 2 features 414. MLP-2 422 is applied to objective 2 features 414 but not to embeddings 412 or objective 1 features 410.

MLP-1 416 produces a latent layer 418. Latent layer 418 produces an output, which is a transformation of all of the features used to generate the objective 1 predicted probability. Latent layer 418 also connects with MLP-2 422 such that the output of latent layer 418 becomes an input to MLP-2 422, along with objective 2 features 414. MLP-2 produces an output, which is the objective 2 predicted probability. In this way, searchee features impact or are reflected in the objective 1 predicted probability 420 and at the same time, searcher features 208 impact or are reflected in the objective 2 predicted probability 424.

Objective 1 predicted probability 420 and objective 2 predicted probability 424 are part of outcome prediction data 304, which is provided to optimization solver 306 as shown in FIG. 3, discussed above.

FIG. 5 is a flow diagram of an example method to generate ranked search results in accordance with some embodiments of the present disclosure.

The method 500 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof In some embodiments, the method 500 is performed by the searchee-searcher optimization system 160 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 502, the processing device, based on a search query received from a searcher user, generates a first set of search results that includes a content item created by a searchee user of the online system, where the content item has been distributed in the online system by the searchee user. Operation 502 is performed by, for example, search engine 132, described above. Operation 502 may be performed, for example, prior to searchee-searcher optimization system 160 being invoked.

At operation 504, the processing device applies at least one machine learning model to features of the search query, features of the searcher user, features of the searchee content item, and features of the searchee user to produce predicted probability data.

In some embodiments, predicted probability data generated by operation 504 includes outcome prediction data 304, described above. In some embodiments, the predicted probability data includes first outcome prediction data produced by a first tower of the machine learning model. In some embodiments, the machine learning model is a multi-task learning model that includes the first tower and a second tower. In some embodiments, the predicted probability data includes producing the second outcome prediction data by the second tower of the machine learning model. In some embodiments, the second tower is connected to an output of the first tower. Operation 504 is performed by, for example, searchee-searcher optimization system 160 using machine learning model 302, described above.

At operation 506, the processing device produces, by at least one machine learning model, a first outcome prediction that represents a probability of a first objective relating to engagement of the searcher user with the content item and a second outcome prediction that represents a probability of a second objective relating to engagement of the searchee user with the online system subsequent to the engagement of the searcher user with the content item. Operation 506 is performed by, for example, machine learning model 302, described above. An example of a machine learning model 302 is shown by FIG. 4, described above.

At operation 508, the processing device applies a multi-objective optimization algorithm to the first objective and the second objective given one or more constraints and the outcome prediction data produced at operation 506, to produce parameter data. Operation 508 is performed by, for example, optimization solver 306, described above. The parameter data produced by operation 508 is, for example, parameter data 308, described above.

At operation 510, the processing device generates a serving function based on the first objective and the second objective. Generating the serving function includes applying the parameter data produced at operation 508 to a generic serving function to produce a serving plan, in some embodiments. Operation 508 is performed by, for example, optimization solver 306, described above.

At operation 512, the processing device produces a set of ranked search results based on the first set of search results. Operation 512 is performed by, for example, search engine 132 applying the serving plan produced at operation 510 to the set of search results generated at operation 502.

FIG. 6 is a block diagram of an example computer system 600 in which embodiments of the present disclosure can operate. FIG. 6 illustrates an example machine of a computer system 600 within which a set of instructions, for causing the machine to perform any one or more of the methodologies discussed herein, can be executed. In some embodiments, the computer system 600 can correspond to a component of a networked computer system (e.g., the computer system 100 of FIG. 1) that includes, is coupled to, or utilizes a machine to execute an operating system to perform operations corresponding to searchee-searcher optimization system 160 of FIG. 1.

The machine is connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine is a personal computer (PC), a smart phone, a tablet PC, a set-top box (STB), a Personal Digital Assistant (PDA), a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a memory 606 (e.g., flash memory, static random access memory (SRAM), etc.), an input/output system 610, and a data storage system 640, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 612 for performing the operations and steps discussed herein.

Instructions 612 include portions of the searchee-searcher optimization system when those portions of searchee-searcher optimization system are being executed by processing device 602. Thus, similar to the description above, searchee-searcher optimization system 160 is shown in dashed lines as part of instructions 612 to illustrate that, at times, portions of searchee-searcher optimization system 160 are executed by processing device 602. For example, when at least some portion of the searchee-searcher optimization system is embodied in instructions to cause processing device 602 to perform the method(s) described above, some of those instructions can be read into processing device 602 (e.g., into an internal cache or other memory) from main memory 604 and/or data storage system 640. However, it is not required that all of searchee-searcher optimization system 160 be included in instructions 612 at the same time and portions of searchee-searcher optimization system 160 are stored in one or more other components of computer system 600 at other times, e.g., when one or more portions of searchee-searcher optimization system 160 are not being executed by processing device 602.

The computer system 600 further includes a network interface device 608 to communicate over the network 620. Network interface device 608 provides a two-way data communication coupling to a network. For example, network interface device 608 can be an integrated-services digital network (ISDN) card, cable modem, satellite modem, or a modem to provide a data communication connection to a corresponding type of telephone line. As another example, network interface device 608 can be a local area network (LAN) card to provide a data communication connection to a compatible LAN. Wireless links can also be implemented. In any such implementation network interface device 608 can send and receives electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 600.

Computer system 600 can send messages and receive data, including program code, through the network(s) and network interface device 608. In the Internet example, a server can transmit a requested code for an application program through the Internet and network interface device 608. The received code can be executed by processing device 602 as it is received, and/or stored in data storage system 640, or other non-volatile storage for later execution.

The input/output system 610 includes an output device, such as a display, for example a liquid crystal display (LCD) or a touchscreen display, for displaying information to a computer user, or a speaker, a haptic device, or another form of output device. The input/output system 610 can include an input device, for example, alphanumeric keys and other keys configured for communicating information and command selections to processing device 602. An input device can, alternatively or in addition, include a cursor control, such as a mouse, a trackball, or cursor direction keys for communicating direction information and command selections to processing device 602 and for controlling cursor movement on a display. An input device can, alternatively or in addition, include a microphone, a sensor, or an array of sensors, for communicating sensed information to processing device 602. Sensed information can include voice commands, audio signals, geographic location information, and/or digital imagery, for example.

The data storage system 640 includes a machine-readable storage medium 642 (also known as a computer-readable medium) on which is stored one or more sets of instructions 644 or software embodying any one or more of the methodologies or functions described herein. The instructions 644 can also reside, completely or at least partially, within the main memory 604 and/or within the processing device 602 during execution thereof by the computer system 600, the main memory 604 and the processing device 602 also constituting machine-readable storage media.

In one embodiment, the instructions 626 include instructions to implement functionality corresponding to a searchee-searcher optimization component (e.g., the searchee-searcher optimization system 160 of FIG. 1).

Dashed lines are used in FIG. 6 to indicate that it is not required that the searchee-searcher optimization system be embodied entirely in instructions 612, 614, and 644 at the same time. In one example, portions of the searchee-searcher optimization system are embodied in instructions 644, which are read into main memory 604 as instructions 614, and portions of instructions 614 are read into processing device 602 as instructions 612 for execution. In another example, some portions of the searchee-searcher optimization system are embodied in instructions 644 while other portions are embodied in instructions 614 and still other portions are embodied in instructions 612.

While the machine-readable storage medium 642 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100, can carry out the computer-implemented methods of FIG. 2, FIG. 3, FIG. 4, and/or FIG. 5 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

Illustrative examples of the technologies disclosed herein are provided below. An embodiment of the technologies may include any of the examples or a combination of the described below.

In an example 1, a method includes applying at least one machine learning model to features of a search query, features of a searcher user, features of a searchee content item, and features of a searchee user; producing, by the at least one machine learning model, a first outcome prediction that represents a probability of a first objective relating to engagement of the searcher user with a content item in an online system and a second outcome prediction that represents a probability of a second objective relating to engagement of the searchee user with the online system responsive to the engagement of the searcher user with the content item;

applying a multi-objective optimization solver to the first objective, the second objective and an outcome prediction that is a combination of the first outcome prediction and the second outcome prediction; and by the multi-objective optimization solver, generating a serving function for a search engine based on the first objective, the second objective, and the outcome prediction.

An example 2 includes the subject matter of example 1, and further includes, by the multi-objective optimization solver, (i) generating parameter data based on the outcome prediction and (ii) by applying the parameter data to the serving function, generating a serving plan. An example 3 includes the subject matter of example 2, and further includes applying the serving plan to a set of search results that includes the content item; and using the serving plan, producing a set of ranked search results that includes the content item, based on the set of search results. An example 4 includes the subject matter of example 3, and further includes providing the set of ranked search results, instead of the set of search results, to a device used by the searcher user. An example 5 includes the subject matter of any of examples 1-4, and further includes ranking search results based on a multi-objective optimization outcome; where the searcher user is a content viewer and the searchee user is an author of content viewed by the searcher user. An example 6 includes the subject matter of any of examples 1-5, and further includes receiving the search query from a device used by the searcher user. An example 7 includes the subject matter of any of examples 1-6, and further includes, based on the search query, generating a set of search results including the content item; where the content item is created in the online system by the searchee user of the online system. An example 8 includes the subject matter of any of examples 1-7, and further includes, by the at least one machine learning model, producing the first outcome prediction by a first tower of the machine learning model; where the machine learning model is a multi-task learning model including the first tower and a second tower. An example 9 includes the subject matter of example 8, and further includes by the at least one machine learning model, producing the second outcome prediction by the second tower of the machine learning model; where the second tower is connected to an output of the first tower. An example 10 includes the subject matter of any of examples 1-9, where the second objective is in conflict with the first objective.

In an example 11, a system includes at least one processor; and at least one memory coupled to the at least one processor; where the at least one memory includes instructions that, when executed by the at least one processor, are capable of causing the at least one processor to perform operations including: applying at least one machine learning model to features of a search query, features of a searcher user, features of a searchee content item, and features of a searchee user; producing, by the at least one machine learning model, a first outcome prediction that represents a probability of a first objective relating to engagement of the searcher user with a content item in an online system and a second outcome prediction that represents a probability of a second objective relating to engagement of the searchee user with the online system responsive to the engagement of the searcher user with the content item; applying a multi-objective optimization solver to the first objective, the second objective and an outcome prediction that is a combination of the first outcome prediction and the second outcome prediction; and by the multi-objective optimization solver, generating a serving function for a search engine based on the first objective, the second objective, and the outcome prediction.

An example 12 includes the subject matter of example 11, where the instructions, when executed by the at least one processor, are capable of causing the at least one processor to perform operations and further includes, by the multi-objective optimization solver, (i) generating parameter data based on the outcome prediction and (ii) by applying the parameter data to the serving function, generating a serving plan. An example 13 includes the subject matter of example 12, where the instructions, when executed by the at least one processor, are capable of causing the at least one processor to perform operations and further includes applying the serving plan to a set of search results that includes the content item; and using the serving plan, producing a set of ranked search results that includes the content item, based on the set of search results. An example 14 includes the subject matter of example 13, where the instructions, when executed by the at least one processor, are capable of causing the at least one processor to perform operations and further includes providing the set of ranked search results, instead of the set of search results, to a device used by the searcher user. An example 15 includes the subject matter of any of examples 11-14, where the instructions, when executed by the at least one processor, are capable of causing the at least one processor to perform operations and further includes ranking search results based on a multi-objective optimization outcome; where the searcher user is a content viewer and the searchee user is an author of content viewed by the searcher user. An example 16 includes the subject matter of any of examples 11-15, where the instructions, when executed by the at least one processor, are capable of causing the at least one processor to perform operations and further includes receiving the search query from a device used by the searcher user. An example 17 includes the subject matter of example 16, where the instructions, when executed by the at least one processor, are capable of causing the at least one processor to perform operations and further includes based on the search query, generating a set of search results including the content item; where the content item is created in the online system by the searchee user of the online system. An example 18 includes the subject matter of any of examples 11-17, where the instructions, when executed by the at least one processor, are capable of causing the at least one processor to perform operations and further includes, by the at least one machine learning model, producing the first outcome prediction by a first tower of the machine learning model; where the machine learning model is a multi-task learning model including the first tower and a second tower. An example 19 includes the subject matter of example 18, where the instructions, when executed by the at least one processor, are capable of causing the at least one processor to perform operations and further includes by the at least one machine learning model, producing the second outcome prediction by the second tower of the machine learning model; where the second tower is connected to an output of the first tower. An example 20 includes the subject matter of any of examples 11-20, where the second objective is in conflict with the first objective.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
applying at least one machine learning model to features of a search query, features of a searcher user, features of a searchee content item, and features of a searchee user;
producing, by the at least one machine learning model, a first outcome prediction that represents a probability of a first objective relating to engagement of the searcher user with a content item in an online system and a second outcome prediction that represents a probability of a second objective relating to engagement of the searchee user with the online system responsive to the engagement of the searcher user with the content item;
applying a multi-objective optimization solver to the first objective, the second objective and an outcome prediction that is a combination of the first outcome prediction and the second outcome prediction; and
by the multi-objective optimization solver, generating a serving function for a search engine based on the first objective, the second objective, and the outcome prediction.

2. The method of claim 1, further comprising:
by the multi-objective optimization solver, (i) generating parameter data based on the outcome prediction and (ii) by applying the parameter data to the serving function, generating a serving plan.

3. The method of claim 2, further comprising:
applying the serving plan to a set of search results that includes the content item; and
using the serving plan, producing a set of ranked search results that includes the content item, based on the set of search results.

4. The method of claim 3, further comprising:
providing the set of ranked search results, instead of the set of search results, to a device used by the searcher user.

5. The method of claim 1, further comprising:
ranking search results based on a multi-objective optimization outcome;
wherein the searcher user is a content viewer and the searchee user is an author of content viewed by the searcher user.

6. The method of claim 1, further comprising:
receiving the search query from a device used by the searcher user.

7. The method of claim 1, further comprising:
based on the search query, generating a set of search results including the content item;
wherein the content item is created in the online system by the searchee user of the online system.

8. The method of claim 1, further comprising:
by the at least one machine learning model, producing the first outcome prediction by a first tower of the at least one machine learning model;
wherein the machine learning model is a multi-task learning model comprising the first tower and a second tower.

9. The method of claim 8, further comprising:
by the at least one machine learning model, producing the second outcome prediction by the second tower of the at least one machine learning model;
wherein the second tower is connected to an output of the first tower.

10. The method of claim 1, wherein the second objective is in conflict with the first objective.

11. A system comprising:
at least one processor; and
at least one memory coupled to the at least one processor;
wherein the at least one memory comprises instructions that, when executed by the at least one processor, are capable of causing the at least one processor to perform operations comprising:
applying at least one machine learning model to features of a search query, features of a searcher user, features of a searchee content item, and features of a searchee user;
producing, by the at least one machine learning model, a first outcome prediction that represents a probability of a first objective relating to engagement of the searcher user with a content item in an online system and a second outcome prediction that represents a probability of a second objective relating to engagement of the searchee user with the online system responsive to the engagement of the searcher user with the content item;
applying a multi-objective optimization solver to the first objective, the second objective and an outcome prediction that is a combination of the first outcome prediction and the second outcome prediction; and
by the multi-objective optimization solver, generating a serving function for a search engine based on the first objective, the second objective, and the outcome prediction.

12. The system of claim 11, wherein the instructions, when executed by the at least one processor, are capable of causing the at least one processor to perform operations further comprising:
by the multi-objective optimization solver, (i) generating parameter data based on the outcome prediction and (ii) by applying the parameter data to the serving function, generating a serving plan.

13. The system of claim 12, wherein the instructions, when executed by the at least one processor, are capable of causing the at least one processor to perform operations further comprising:
applying the serving plan to a set of search results that includes the content item; and
using the serving plan, producing a set of ranked search results that includes the content item, based on the set of search results.

14. The system of claim 13, wherein the instructions, when executed by the at least one processor, are capable of causing the at least one processor to perform operations further comprising:
providing the set of ranked search results, instead of the set of search results, to a device used by the searcher user.

15. The system of claim 11, wherein the instructions, when executed by the at least one processor, are capable of causing the at least one processor to perform operations further comprising:
ranking search results based on a multi-objective optimization outcome;
wherein the searcher user is a content viewer and the searchee user is an author of content viewed by the searcher user.

16. The system of claim 11, wherein the instructions, when executed by the at least one processor, are capable of causing the at least one processor to perform operations further comprising:

receiving the search query from a device used by the searcher user.

17. The system of claim 11, wherein the instructions, when executed by the at least one processor, are capable of causing the at least one processor to perform operations further comprising:
   based on the search query, generating a set of search results including the content item;
   wherein the content item is created in the online system by the searchee user of the online system.

18. The system of claim 11, wherein the instructions, when executed by the at least one processor, are capable of causing the at least one processor to perform operations further comprising:
   by the at least one machine learning model, producing the first outcome prediction by a first tower of the at least one machine learning model;
   wherein the at least one machine learning model is a multi-task learning model comprising the first tower and a second tower.

19. The system of claim 18, wherein the instructions, when executed by the at least one processor, are capable of causing the at least one processor to perform operations further comprising:
   by the at least one machine learning model, producing the second outcome prediction by the second tower of the at least one machine learning model;
   wherein the second tower is connected to an output of the first tower.

20. The system of claim 11, wherein the second objective is in conflict with the first objective.

\* \* \* \* \*